United States Patent [19]

Teramachi

[11] Patent Number: 4,620,751
[45] Date of Patent: Nov. 4, 1986

[54] ROLLER BEARING FOR LINEAR MOTION

[76] Inventor: Hiroshi Teramachi, 3-4-6, Kamiosaki, Shinagawa-ku, Tokyo, Japan

[21] Appl. No.: 727,792

[22] Filed: Apr. 26, 1985

[30] Foreign Application Priority Data

Sep. 28, 1984 [JP] Japan .............................. 59-145655[U]
Sep. 28, 1984 [JP] Japan .............................. 59-145656[U]
Sep. 28, 1984 [JP] Japan .............................. 59-145657[U]

[51] Int. Cl.⁴ .............................................. F16C 29/06
[52] U.S. Cl. ........................................................ 384/44
[58] Field of Search ...................... 308/6 C, 6 R, 6 A; 464/168

[56] References Cited

U.S. PATENT DOCUMENTS

| 3,467,447 | 9/1969 | Newman | 308/6 C |
| 3,642,330 | 2/1972 | Newman | 308/6 C |
| 3,758,176 | 9/1973 | Stapley | 308/6 C |
| 4,352,526 | 10/1982 | Imai | 308/6 R |

Primary Examiner—Lenard A. Footland
Attorney, Agent, or Firm—Kenyon & Kenyon

[57] ABSTRACT

A roller bearing for a linear motion includes a bearing body having its opposing side surfaces respectively formed with a loaded roller rolling passage and a non-loaded roller rolling passage which extend in the longitudinal direction of the bearing body. A pair of end caps are respectively secured to both longitudinal ends of the bearing body. Each of the end caps has a roller-turning passage which connects the loaded and non-loaded roller rolling passages. The roller bearing further includes a multiplicity of rollers disposed within the loaded and non-loaded roller rolling passages. The loaded roller rolling passage is constituted by two or more parallel loaded roller rolling grooves each having a depth smaller than the diameter of the rollers. The non-loaded roller rolling passage is constituted by two or more parallel non-loaded roller rolling grooves each having a depth larger than the diameter of the rollers. Further, a load bearing portion is formed on the bearing body between the adjacent non-loaded roller rolling grooves. The load bearing portion has its surface made substantially flush with the surface of the bearing body at the side at which the non-loaded roller rolling grooves are formed.

5 Claims, 15 Drawing Figures

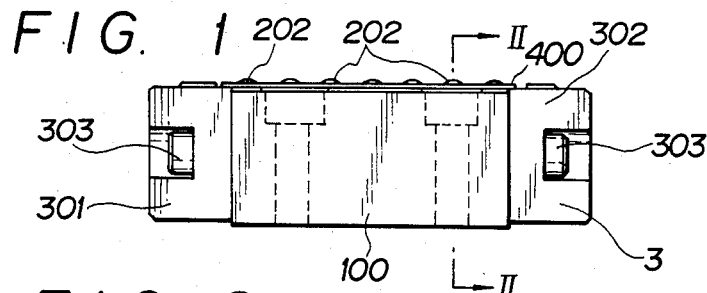
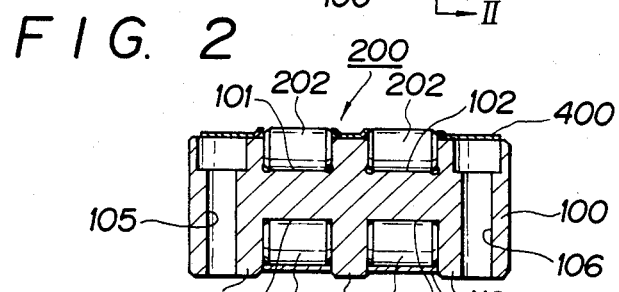
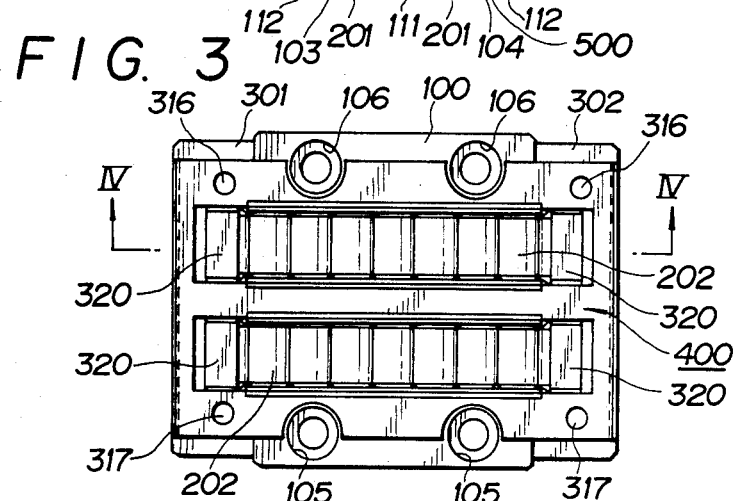
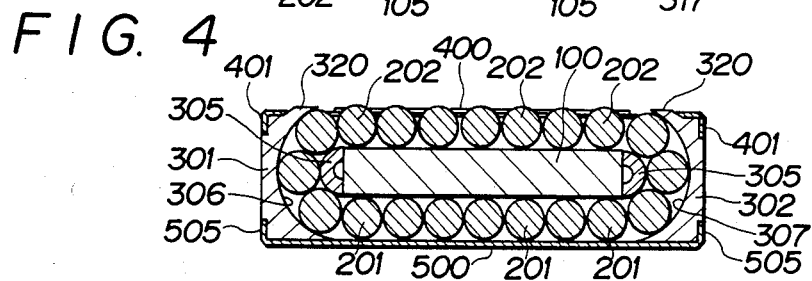

ROLLER BEARING FOR LINEAR MOTION

BACKGROUND OF THE INVENTION

1. Field of the Invention

The present invention relates to a roller bearing for a linear motion which is low in terms of the friction and has high accuracy and high rigidity and which may be applied to a linear motion part of a machine which is required to possess high operation performance and high accuracy, such as a machine tool, an industrial machine or a measuring apparatus.

2. Description of the Prior Art

A roller bearing for a linear motion has heretofore been known, such as that shown in FIGS. 13 and 14. More specifically, a roller bearing 1 is composed of a bearing body 4, a pair of end caps 6, 6, a multiplicity of rollers 7, 7 ... and a guide member 9. The bearing body 4 has a substantially H-shaped cross-section and upper and lower surfaces opposing each other. A non-loaded roller rolling passage which is constituted by a single non-loaded roller rolling groove 2 with a rectangular cross-section is formed on the upper surface of the bearing body 4, while a loaded roller rolling passage which is constituted by a single loaded roller rolling groove 3 is formed on the lower surface. The end caps 6, 6 are respectively secured to both longitudinal ends of the bearing body 4. Each of the end caps 6, 6 is provided therein with a circular roller turning passage 5 which connects the non-loaded and loaded roller rolling grooves 2 and 3. The rollers 7, 7 ... are housed within the non-loaded and loaded roller rolling grooves 2 and 3. Each of the rollers 7, 7 ... is constituted by two cylindrical members which are coaxially connected together by a smaller-diameter connecting portion 7a. The guide member 9 is constituted by an endless wire which is disposed such as to surround the connecting portions 7a, 7a ... of all the rollers 7, 7 ... and to thereby guide and retain the rollers 7, 7 ...

Incidentally, when the above-described roller bearing 1 is applied to a linear motion part of various kinds of machine, the following problem is encountered. Namely, the loaded rollers 7, 7 ..., being disposed within the loaded roller rolling groove 3 of the bearing body 4, roll on the slide surface (not shown) of the machine, and when doing so, the load applied to the loaded rollers 7, 7 ... from the slide surface is born by side portions 8, 8 of the bearing body 4, which has a substantially H-shaped cross-section, on both sides of the roller rolling grooves 2, 3. In consequence, the bearing body 4 may be warped at its central portion which has a lesser thickness than its side portions and consequently has smaller rigidity. As a result, an abnormally large surface pressure may act on both end portions 7b, 7b of each of the loaded rollers 7, causing the rollers 7 to become abnormally worn and the life of the roller bearing 1 to be unfavorably shortened.

Further, since the loaded rollers 7, 7 ... are retained solely by a single guide member 9 constituted by an endless wire, the rollers 7, 7 ... easily skew as they enter the loaded region (loaded roller rolling groove) from the non-loaded region, so that there is a risk of breakage of the smaller-diameter connecting portions 7a, 7a ... respectively constituting the central portions of the rollers 7, 7 ...

Still another problem experienced with the conventional roller bearing 1 is that when the side surfaces of an annular groove formed in the center of each of the rollers 7, 7 ... within the loaded region contacts any curved portion of the guide member 9, the rollers 7, 7 encounter large resistance and they are thereby prevented from rolling smoothly.

SUMMARY OF THE INVENTION

In view of the above-described problems of the prior art, it is a primary object of the present invention to increase the rigidity of the central portion of the bearing body so that it experiences hardly any warping or deformation even when a heavy load is applied to the loaded rollers, thereby preventing a large surface pressure from acting locally on the loaded rollers, whereby abnormal wearing of the rollers is avoided and the life of the roller bearing is greatly extended.

It is a subsidiary object of the present invention to allow the rollers to move smoothly as they enter the loaded region from the non-loaded region without skewing, thereby preventing as much as possible any likelihood of breakage of the rollers, and ensuring smooth rolling of the rollers within the loaded region.

It is another subsidiary object of the present invention to increase the dust-proofing effect and improve the retention of a lubricating oil by substantially completely hermetically sealing the non-loaded rollers within the non-loaded roller rolling groove by employing a support plate, whereby generation of noise as a result of contact between adjacent rollers is prevented and further the leakage of any noise to the outside is shut off.

To achieve the primary object, the present invention provides a roller bearing for a linear motion comprising: a bearing body having its opposing side surfaces respectively formed with a loaded roller rolling passage and a non-loaded roller rolling passage which extend in the longitudinal direction of the bearing body; a pair of end caps respectively secured to both longitudinal ends of the bearing body, each of the end caps having a roller turning passage which connects the loaded and non-loaded roller rolling passages; and a multiplicity of rollers disposed within the loaded and non-loaded roller rolling passages. The The loaded roller rolling passage is constituted by two or more parallel loaded roller rolling grooves each having a depth smaller than the diameter of the rollers. The non-loaded roller rolling passage is constituted by two or more parallel non-loaded roller rolling grooves each having a depth larger than the diameter of the rollers. A load bearing portion is formed on the bearing body between the adjacent non-loaded roller rolling grooves, the load bearing portion having its surface made substantially flush with the surface of the bearing body at that side at which the non-loaded roller rolling grooves are formed.

The above and other objects, features and advantages of the present invention will become clear from the following description of the preferred embodiment thereof, taken in conjunction with the accompanying drawings.

BRIEF DESCRIPTION OF THE DRAWINGS

FIG. 1 is a front elevational view of a roller bearing for a linear motion according to the present invention;

FIG. 2 is a sectional view taken along the line II—II of FIG. 1;

FIG. 3 is a plan view of the roller bearing shown in FIG. 1;

FIG. 4 is a sectional view taken along the line IV—IV of FIG. 3;

DESCRIPTION OF THE PREFERRED EMBODIMENT

Figure 5:
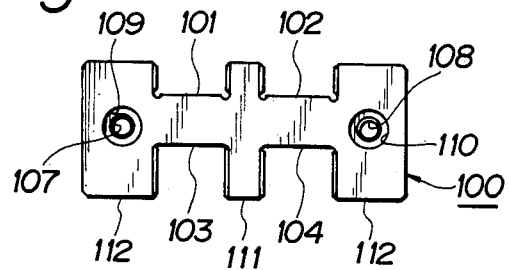
FIG. 5 is a side elevational view of a bearing body employed in the roller bearing according to the present invention.

One embodiment of the present invention will be described hereinunder with reference to the accompanying drawings.

Referring first to FIGS. 1 to 5, a bearing body 100 is formed from a substantially rectangular parallelepiped steel material. The bearing body 100 has two parallel loaded roller rolling grooves 101, 102 and two parallel non-loaded roller rolling grooves 103, 104 respectively formed on its opposing side surfaces, that is, the upper and lower surfaces in the case of the illustrated example. These grooves 101, 102, 103 and 104 have the same width which is slightly larger than the width or lateral dimension of rollers 200. The non-loaded roller rolling grooves 103, 104 have a depth slightly larger than the diameter of the rollers 200 which are housed therein, while the loaded roller rolling grooves 101, 102 have a depth slightly smaller than the diameter of the rollers 200 housed therein.

The bearing body 100 has a load bearing portion 111 formed on its lower surface between the non-loaded roller rolling grooves 103, 104. The surface of the load bearing portion 111 is made substantially flush with the respective bottom surfaces of both side portions 112, 112 of the bearing body 100.

Four bolt receiving bores 105, 106 are respectively formed in the left and right side portions of the bearing body 100 for the purpose of securing the roller bearing to various kinds of machine or apparatus (see FIGS. 1 to 3).

As shown in FIG. 5, the bearing body 100 is formed at its opposite longitudinal ends (only one of them is shown) with internally threaded holes 107, 108, into which are threaded bolts 303 with hexagonal heads for securing end caps 301, 302 to the opposite ends of the bearing body 100. Positioning spot facings 109, 110 are formed at the respective end portions of the internal threads 107, 108.

Figure 6A:
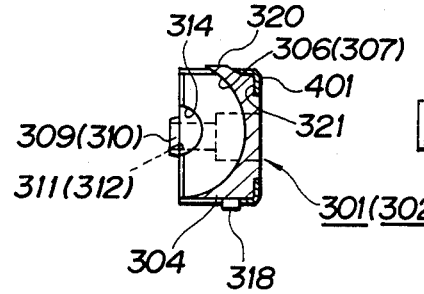
FIG. 6(a) is a vertical sectional view of a guide block constituting an end cap employed in the roller bearing according to the present invention.
Figure 6B:
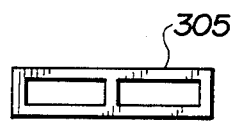
FIG. 6(b) is a front elevational view of a guide piece which is incorporated in the guide block shown in FIG. 6(a)
Figure 7:
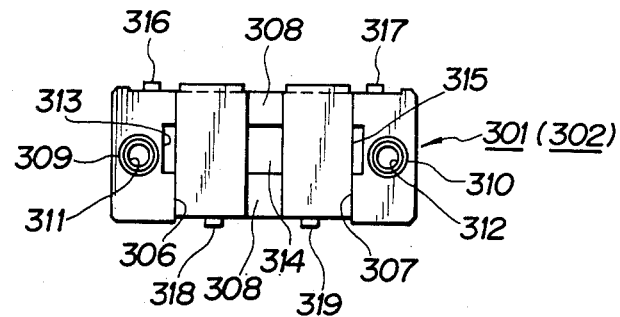
FIG. 7 is a side elevational view of the guide block shown in FIG. 6(a) as viewed from the left-hand side thereof.

Each of the end caps 301, 302 is, as shown in FIGS. 6(a), 6(b) and 7, constituted by a guide block 304 and a semi-columnar guide piece 305 (see FIG. 6(b)) which are molded by employing a die casting alloy or a plastic for the purpose of reducing the weight of the roller bearing. The guide block 304 has roller-turning grooves 306, 307 formed on its inner peripheral surface, the grooves 306, 307 connecting together the corresponding roller rolling grooves 101, 102 and 103, 104 which are respectively formed on the upper and lower surfaces of the bearing body 100. The guide block 304 further has partition walls 308 formed between the roller turning grooves 306 and 307.

A tongue piece 320 is integrally formed at the upper portion of each of the roller turning grooves 306, 307 of the guide block 304. The tongue piece 320 enables the loaded rollers 202 to be smoothly guided into the end cap 301 (302), thereby making it possible to prevent generation of abnormal noise.

Annular projections 309, 310 are integrally formed on the inner end face of the guide block 304 such as to be fitted in the respective positioning spot facings 109, 110 in order to mount the guide block 304 at a predetermined position on the end face of the bearing body 100. Further, mounting bolt receiving bores 311, 312 are formed in the guide block 304 in such a manner that the bores 311, 312 extend through the guide block 304 coaxially with the respective projections 309, 310.

As shown in FIGS. 6(a) and 7, recesses 313, 314 and 315 with a semi-circular cross-section are respectively formed at the left, central and right portions on the inner end face of the guide block 304 in such a manner that the respective centers of the recesses 313, 314 and 315 are located on the same imaginary horizontal line. The elongaged semi-columnar guide piece 305 is fitted and secured into these recesses 313, 314 and 315.

Pins 316, 317 for securing a retainer plate 400 (described later) are formed on the upper surface of the guide block 304 such as to be located outwardly of the corresponding roller turning grooves 306, 307. Further, pins 318, 319 for securing a support plate 500 (described later) are formed on the lower surface of the guide block 304 in such a manner that the pins 318, 319 are located closer to the center of the guide block 304 than the centers of the corresponding roller turning grooves 306, 307 (see FIG. 7).

As shown in FIG. 6(a), the guide block 304 has steps 321 formed at the respective upper portions of its front and rear ends. The steps 321 are designed to receive respective bent portions 401 of the retainer plate 400.

Figure 8:
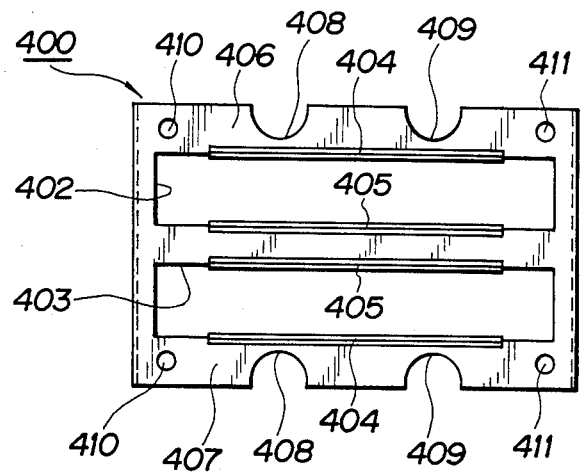
FIG. 8 is a plan view of a retainer plate employed in the roller bearing according to the present invention.
Figure 9:
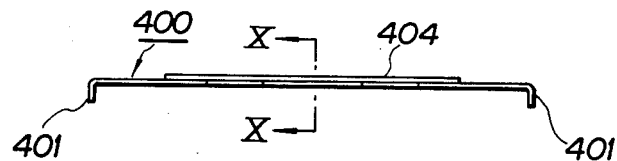
FIG. 9 is a front elevational view of the retainer plate shown in FIG. 8.
Figure 10:
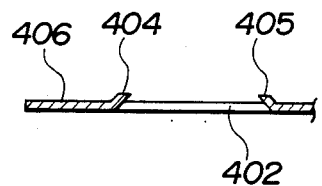
FIG. 10 is a sectional view taken along the line X—X of FIG. 9.

Referring now to FIGS. 8 to 10, the retainer plate 400 is formed from steel plate which is blanked such as to form slits 402, 403 with a width slightly smaller than the width or lateral dimension of the rollers 200. Further, the retainer plate 400 is integrally formed with bent portions 404, 405 which serve to prevent the rollers 200 from coming off the loaded roller rolling grooves 101, 102, each of the bent portions 404, 405 extending along the edge of its corresponding slit 402 (403) in the longitudinal direction thereof. Moreover, the retainer plate 400 has semi-circular notches 408, 409 and pin receiving bores 410, 411 formed at each of its side portions 406, 407, the notches 408, 409 being made coincident with the respective bolt receiving bores 105, 106 formed in the bearing body 100, and the pin receiving bores 410, 411 being adapted to receive the respective pins 316, 317 formed on the guide block 304 constituting the end cap 301 (302). Further, the steel plate which constitutes the retainer plate 400 is downwardly bent, as viewed in FIG. 9, at its longitudinal end portions (the right and left end portions as viewed in FIGS. 8 and 9) such as to form the above-described bent portions 401, 402.

Figure 11:
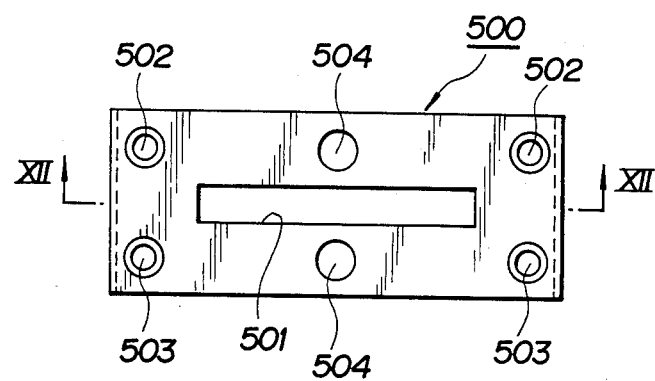
FIG. 11 is a plan view of a support plate employed in the roller bearing according to the present invention.
Figure 12:
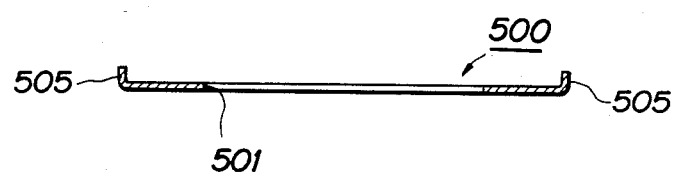
FIG. 12 is a sectional view taken along the line XII—XII of FIG. 11.
Figure 13:
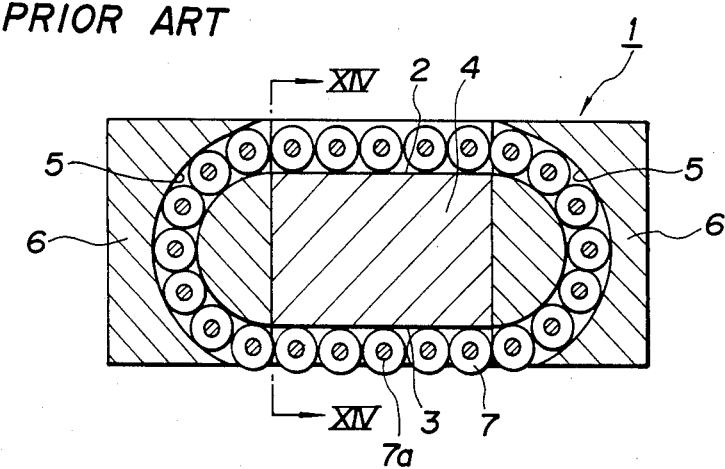
FIG. 13 is a vertical sectional front elevational view of a conventionally known roller bearing.
Figure 14:
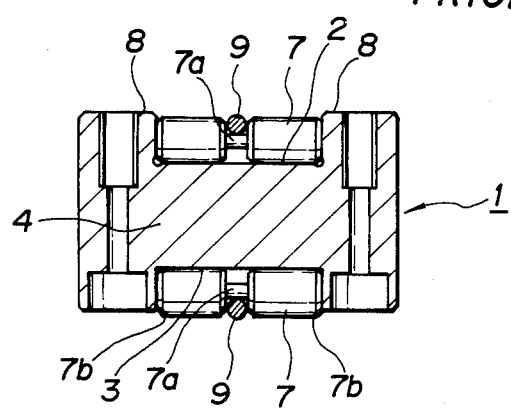
FIG. 14 is a sectional view taken along the line XIV—XIV of FIG. 13.

As shown in detail in FIGS. 4, 11 and 12, a rectangular support plate 500 formed from steel plate is mounted on the lower surface of the bearing body 100. The support plate 500 has a slit 501 formed in its center, the slit 501 extending in the longitudinal direction of the support plate 500 and having a lateral width slightly larger than the lateral width of the load bearing portion 11 formed on the bearing body 100. The support plate 500 further has pin receiving bores 502, 503 respectively formed in its four corners, the bores 502, 503 being adapted to receive the respective pins 318, 319 formed on the guide block 304 constituting the end cap 301 (302). In addition, oil holes 504 are formed on both sides of the slit 501. Further, both longitudinal end portions of the support plate 500 (the right and left end portions as viewed in FIGS. 11 and 12) are bent upwardly such as to form bent portions 505, 505.

It is to be noted that, although in the above-described embodiment, the number of loaded roller rolling grooves and that of non-loaded roller rolling grooves are both two, the number of these two kinds of grooves may be three or more.

As has been described above, the bearing body of the roller bearing for a linear motion according to the present invention has the loaded and non-loaded roller rolling grooves for respectively guiding the loaded and non-loaded rollers formed in such a manner that they have a width slightly larger than the width or lateral dimension of the rollers. Further, the bearing body is designed to guide the rollers by means of both side surfaces of each of the grooves. Therefore, each individual roller is uniformly loaded around its entire circumference so that the roller is securely prevented from skewing.

Further, the load bearing portion is formed on the bearing body between the non-loaded roller rolling grooves, and the surface of the load bearing portion is made substantially flush with the surface of the bearing body on the side thereof where the non-loaded roller rolling grooves are formed. For this reason, any load which is vertically applied to the loaded rollers is born by both side portions of the bearing body and the load bearing portion. It is therefore possible for the bearing body to possess rigidity by which it is able to satisfactorily bear heavy loads. In consequence, the bearing body is favorably prevented from being warped or deformed, which advantageously acts to stabilize the dimension from the bottom of the bearing body to the upper side of the loaded rollers. Thus, high accuracy is ensured.

Additionally, by mounting the retainer plate on the bearing body, the loaded rollers within the loaded roller rolling grooves on the upper surface of the bearing body are favorably prevented from coming off the rolling grooves by virtue of the bent portions formed in parallel to the edges of the slits formed in the retainer plate. Further, it is possible to accurately position the retainer plate with respect to the bearing body by virtue of the bent portions respectively formed at the longitudinal ends of the retainer plate.

Further, by mounting on the bearing body the support plate which covers the non-loaded roller rolling grooves, the rollers disposed within the non-loaded roller rolling grooves are hermetically sealed by the support plate, whereby it is possible to prevent intrusion of external dust into the non-loaded roller rolling grooves as well as to retain a lubricating oil within the rolling grooves.

Furthermore, it is advantageously possible, by virtue of the existence of the support plate, to prevent transmission to the outside of any noise generated as the result of, for example, contact between adjacent rollers within the non-loaded roller rolling grooves.

What is claimed is:

1. A linear roller bearing comprising:
   a bearing body provided with a first surface and a second surface disposed in parallel relation with each other, said first surface being formed with a plurality of loaded roller grooves for receiving rollers each having a depth less than the diameter of each of the rollers received therein, said second surface being formed with a plurality of non-loaded roller grooves corresponding in number to said loaded roller grooves, each of said non-loaded roller grooves having a depth greater than the diameter of each of the rollers received therein, said second surface having at least three load-bearing land portions disposed on the opposite sides of each of said non-loaded roller grooves, the surfaces of all of said load-bearing land portions being flush with each other whereby they can be placed in abutting engagement with the mounting surface of a structural member when said bearing body is fixedly mounted at its second surface on said structural member; and
   a pair of end caps respectively secured to the opposite ends of said bearing body and each having a plurality of roller-turning passages interconnecting said loaded roller grooves and said non-loaded roller grooves.

2. A linear roller bearing according to claim 1, further comprising a retainer plate mounted on said first surface of said bearing body for retaining said rollers rolling in said loaded roller grooves, said retainer plate having a plurality of slits formed therein at locations corresponding to said loaded roller grooves, each of said slits being slightly smaller in width than each of said rollers, said retainer plate being formed, along the opposite edges of each of said slits, with bent portions for preventing said rollers from coming off.

3. A linear roller bearing according to claim 1, further comprising a support plate means secured to said second surface of said bearing body for covering and closing off said non-loaded roller grooves, the outer surface of said support plate means being disposed flush with or inside of said surfaces of said load-bearing land portions so as to permit said load-bearing land surfaces to be placed in direct contact with said mounting surface of said structural member.

4. A linear roller bearing according to claim 3, wherein said support plate means is fitted in recessed portions on said second surface.

5. A bearing body for a linear roller bearing comprising a first surface and a second surface disposed in parallel relation with each other, said first surface being formed with a plurality of loaded roller grooves for receiving rollers each having a depth less than the diameter of each of the rollers to be received therein, said second surface being formed with a plurality of non-loaded roller grooves, each of said non-loaded roller grooves having a depth greater than the diameter of each of the rollers to be received therein, said second surface having at least three load-bearing land portions disposed on the opposite sides of each of said non-loaded roller grooves, the surfaces of all of said load-bearing land portions being flush with each other whereby they can be placed in abutting engagement with the mounting surface of a structural member when said bearing body is fixedly mounted at its second surface on said structural member.

* * * * *